US008462115B2

(12) United States Patent
Chen et al.

(10) Patent No.: US 8,462,115 B2
(45) Date of Patent: Jun. 11, 2013

(54) MOTION ESTIMATION DEVICE AND POWER SAVING METHOD THEREOF

(75) Inventors: Hsin Chia Chen, Science-Based Industrial Park Hsin-Chu (TW); Ching Lin Chung, Science-Based Industrial Park Hsin-Chu (TW); Yao Ching Hsu, Science-Based Industrial Park Hsin-Chu (TW); Cho Yi Lin, Science-Based Industrial Park Hsin-Chu (TW); Tzu Yi Chao, Science-Based Industrial Park Hsin-Chu (TW)

(73) Assignee: Pixart Imaging Inc. (TW)

( * ) Notice: Subject to any disclaimer, the term of this patent is extended or adjusted under 35 U.S.C. 154(b) by 936 days.

(21) Appl. No.: 12/260,748

(22) Filed: Oct. 29, 2008

(65) Prior Publication Data

US 2009/0195505 A1    Aug. 6, 2009

(30) Foreign Application Priority Data

Feb. 4, 2008  (TW) ................................ 97111984 A

(51) Int. Cl.
*G06F 3/033*    (2006.01)
*G09G 5/08*    (2006.01)

(52) U.S. Cl.
USPC ............ 345/166; 345/156; 345/163; 345/179

(58) Field of Classification Search
USPC .................. 345/166, 156, 163, 167, 179, 180; 250/201.8, 559.05–559.08; 359/197, 223, 359/238, 242, 240, 244, 278, 264
See application file for complete search history.

(56) References Cited

U.S. PATENT DOCUMENTS

| 6,455,840 | B1* | 9/2002 | Oliver et al. ............... 250/222.1 |
| 7,242,391 | B2* | 7/2007 | Lin et al. ........................ 345/166 |
| 7,839,388 | B2* | 11/2010 | Cheah et al. .................. 345/166 |
| 8,044,936 | B2* | 10/2011 | Kwak et al. ................... 345/166 |
| 2005/0068300 | A1* | 3/2005 | Wang et al. ................... 345/166 |
| 2005/0110746 | A1* | 5/2005 | Hou .............................. 345/156 |
| 2007/0132734 | A1* | 6/2007 | Kwak et al. ................... 345/166 |
| 2007/0262243 | A1* | 11/2007 | cheah et al. ............... 250/214 R |

FOREIGN PATENT DOCUMENTS

| TW | I227393 | 2/2005 |
| TW | 200512655 | 4/2005 |

* cited by examiner

*Primary Examiner* — Amare Mengistu
*Assistant Examiner* — Sarvesh J Nadkarni
(74) *Attorney, Agent, or Firm* — Lowe Hauptman Ham & Berner, LLP

(57) ABSTRACT

A power saving method for a motion estimation device which has a fixed sampling period and includes a light source illuminating with an adjustable emitting cycle to provide the needed light for the motion estimation device during capturing images. The power saving method includes: capturing a first image at a first time; capturing a second image at a second time, wherein a time interval between the first time and the second time is identical to one emitting cycle which is an integral multiple of the sampling period; comparing the first image and the second image to obtain a displacement; comparing the displacement with at least one threshold value; and adjusting the emitting cycle of the light source according to a comparison result of comparing the displacement and the threshold value. The present invention further provides a motion estimation device.

19 Claims, 4 Drawing Sheets

MOTION ESTIMATION DEVICE AND POWER SAVING METHOD THEREOF

CROSS REFERENCE TO RELATED APPLICATION

This application claims the priority benefit of Taiwan Patent Application Serial Number 097111984, filed on Apr. 2, 2008, the full disclosure of which is incorporated herein by reference.

BACKGROUND OF THE INVENTION

1. Field of the Invention

This invention generally relates to a motion estimation device and the power saving method thereof, and more particularly, to a motion estimation device and the power saving method thereof both of which can save total power consumption by adjusting the emitting cycle of a light source of the motion estimation device.

2. Description of the Related Art

In order to increase the operational convenience of computer equipments, wireless optical mice have gradually replaced the traditional wired mouse. An optical mouse generally includes a plurality of power consuming components, such as a light source, a digital signal processor, an image sensor and a wireless transmission unit. It has high consumption power and therefore has the problem of limited battery lifetime. In order to solve this problem, the method to reduce the power consumption of an optical mouse by adjusting the image capture frame rate of an image sensor has been proposed in the prior art. For example, U.S. publication No. 20050110746, entitled "Power-saving method for an optical navigation device", discloses a method for controlling the image capture frame rate of an image sensor according to a moving speed, i.e. variations of a horizontal displacement and a vertical displacement per unit time, of an optical navigation device, wherein when the moving speed is faster, the image capture frame rate becomes higher and the exposure time of the image sensor becomes shorter; on the contrary, when the moving speed is slower, the image capture frame rate becomes lower and the exposure time of the image sensor becomes longer. In this manner, the power of the optical navigation device can be saved.

However, the above method, which can save the power consumption of an optical navigation device by adjusting the image capture frame rate and the exposure time of an image sensor, still has following problems. (1). Since the exposure time of the image sensor changes with the moving speed of the optical navigation device, total image brightness appears larger fluctuation to have lower stability. (2). Although the image capture frame rate can decrease with the decreasing of the moving speed of the optical navigation device, the sensing area of the image sensor has to be increased so that the same maximum detectable acceleration obtained under low speed moving status can be equal to that obtained under high speed moving status. Therefore, the loading of the digital signal processor will not linearly decrease with the decreasing of the image capture frame rate.

Another power saving method for an optical navigation device is disclosed in U.S. Pat. No. 6,455,840, entitled "Predictive and pulsed illumination of a surface in a micro-texture navigation technique". The method changes the illuminating rate of a light source according to the velocity of the optical navigation device so as to conserve power. The disclosed method includes the steps of: illuminating the surface with pulses of light occurring at a selected rate; determining a velocity from the tracked movement; increasing the selected rate in response to increases in the determined velocity; and decreasing the selected rate in response to decreases in the determined velocity.

However, the above velocity calculation of the optical navigation device is held based on the pixel size and the frame rate. Not only the signal processing load is increased due to an additional calculating procedure, but the velocity information (for example a velocity threshold), which is served as the reference for adjusting the illuminating rate of the light source, has to be designed differently for high-end and low-end products. For example, for high-end products, the velocity threshold is relatively higher; while for low-end products, the velocity threshold is relatively lower. Therefore, the above power saving method based on changing the illuminating rate of a light source according to the velocity still has following problems. (1). Signal processing load is increased to increase the total power consumption. (2). Different velocity information has to be designed for different products; that is, same velocity information can not be used for all products such that the product design complexity will be increased.

According to the above reasons, the present invention provides a method for dynamically adjusting the emitting cycle of the light source of a motion estimation device according to a displacement of the motion estimation device. When the displacement is relatively low, the emitting cycle of the light source is prolonged so as to decrease the power consumption of the light source. In this manner, the motion estimation device needs not to transfer the detected displacement to moving speed such that the signal processing load can be decreased so as to decrease the total power consumption.

SUMMARY OF THE INVENTION

It is an object of the present invention to provide a motion estimation device and the power saving method thereof, both of which can adjust the emitting cycle of a light source according to a displacement of the motion estimation device between two successive lighting of the light source so as to effectively decrease power consumption.

It is another object of the present invention to provide a motion estimation device and the power saving method thereof, wherein the image sampling period of an image capturing unit is fixed such that the exposure time of the image capturing unit needs not to be changed with the moving speed of the motion estimation device so as to provide higher stability.

It is another object of the present invention to provide a motion estimation device and the power saving method thereof, wherein the displacement information served as a reference for adjusting the emitting cycle of a light source can be adapted to all high-end and low-end products so as to simplify product design.

In order to achieve above objects, the present invention provides a power saving method for a motion estimation device which has a fixed sampling period and includes a light source illuminating with an adjustable emitting cycle to provide the needed light for the motion estimation device during capturing images. The power saving method includes the steps of: capturing a first image at a first time; capturing a second image at a second time, wherein a time interval between the first time and the second time is equal to one emitting cycle which is an integral multiple of the sampling period; comparing the first image and the second image to obtain a displacement; comparing the displacement with at least one threshold value; and adjusting the emitting cycle of the light source according to a comparison result of comparing the displacement and the threshold value.

In the above power saving method for a motion estimation device, when the displacement is too large to be obtained, the emitting cycle is shortened.

According to another aspect of the present invention, the present invention further provides a motion estimation device including a light source, a light source control unit, an image capturing unit, a storage unit and a processing unit. The light source illuminates with an adjustable emitting cycle. The light source control unit is for adjusting the emitting cycle of the light source. The image capturing unit has a fixed sampling period, wherein the emitting cycle of the light source is an integral multiple of the sampling period. The storage unit stores at least one threshold value. The processing unit is for obtaining a displacement according to two images captured by the image capturing unit at two time points separated by one emitting cycle, for comparing the displacement with the threshold value, and for controlling the light source control unit to adjust the emitting cycle of the light source according to a comparison result of comparing the displacement and the threshold value.

According to another aspect of the present invention, the present invention further provides a power saving method for a motion estimation device which includes a light source illuminating with an adjustable emitting cycle to provide the needed light for the motion estimation device during capturing images. The power saving method includes the steps of: capturing images with a fixed sampling period; capturing a first image at a first time; capturing a second image at a second time, wherein a time interval between the first time and the second is equal to one emitting cycle and the emitting cycle is an integral multiple of the sampling period; comparing the first image and the second image to obtain a displacement; comparing the displacement with at least one threshold value; and adjusting the emitting cycle of the light source according to a comparison result of comparing the displacement and the threshold value.

The motion estimation device and the power saving method of the present invention can be adapted to all high-end and low-end products merely by setting a group of displacement threshold value according to the size of the sensing array of the motion estimation device and can achieve the purposes of conserving energy and simplifying design. In addition, the motion estimation device further includes a transmission interface unit for transmitting the detected displacement to an image display device, such as a television, a computer screen, a game machine screen or a projection screen, so as to control a cursor or an aiming point shown on the image display device. Embodiments of the motion estimation device include an optical mouse and an optical navigation device.

BRIEF DESCRIPTION OF THE DRAWINGS

Other objects, advantages, and novel features of the present invention will become more apparent from the following detailed description when taken in conjunction with the accompanying drawings.

DETAILED DESCRIPTION OF THE PREFERRED EMBODIMENT

Figure 1A:
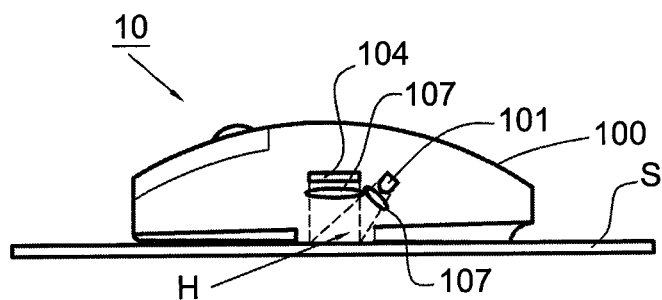
FIG. 1a shows a schematic diagram of the motion estimation device according to one embodiment of the present invention.
Figure 1B:
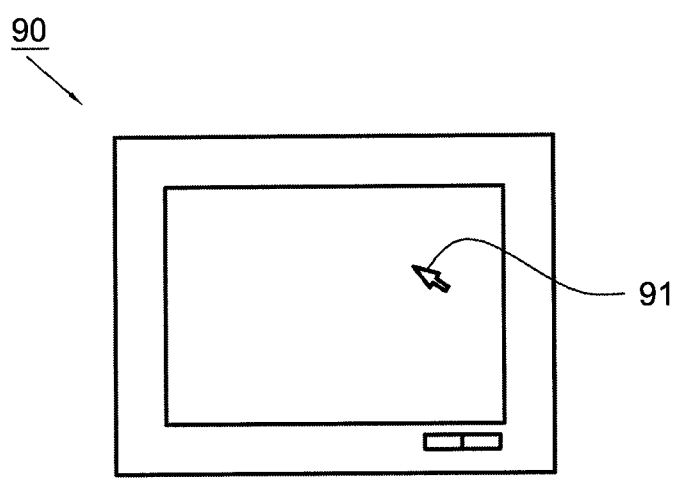
FIG. 1b shows a schematic diagram of the motion estimation device and corresponding image display device according to one embodiment of the present invention.
Figure 2:
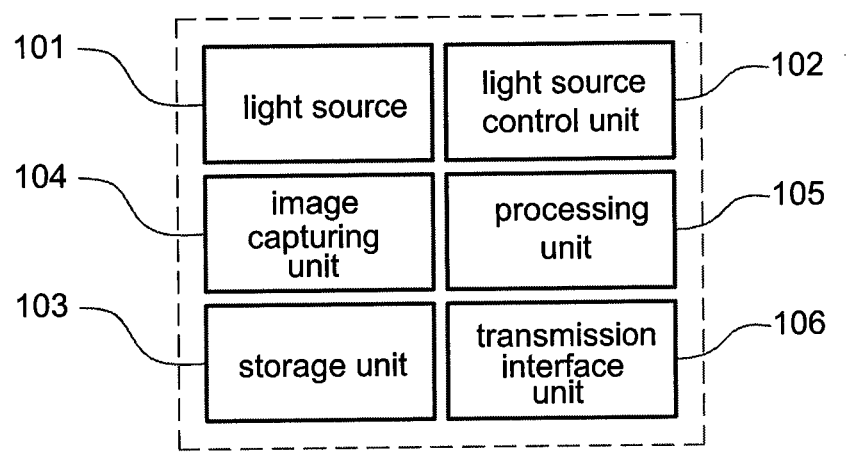
FIG. 2 shows a schematic block diagram of the motion estimation device according to one embodiment of the present invention.

Referring to FIGS. 1a, 1b and 2, they respectively show the schematic diagram and the block diagram of the motion estimation device 10 according to one embodiment of the present invention. The motion estimation device 10 may be an optical mouse or an optical navigation device. The motion estimation device 10 is normally disposed on a surface S, e.g. the surface of a mouse pad or a table, for being operated by a user (not shown) so as to accordingly control the movement of a cursor (or an aiming point) 91 shown on an image display device 90. Embodiments of the image display device 90 include, but not limited to, a television, a projection screen, a computer screen and a game machine screen. The motion estimation device 10 includes a light source 101, a light source control unit 102, a storage unit 103, an image capturing unit 104, a processing unit 105, a transmission interface unit 106 and at least one lens (or lens set) 107.

Although the motion estimation device 10 of the present invention is exemplarily illustrated by an optical mouse as shown in FIG. 1a, it is not used to limit the present invention. The motion estimation device 10 normally includes a housing 100 with an aperture H formed on its bottom surface, and other components of the motion estimation device 10 are disposed inside the housing 100. Embodiments of the light source 101 include, for example, a light emitting diode and a laser diode. The light source 101 illuminates with an adjustable emitting cycle so as to provide the needed light for the image capturing unit 104 during image capturing. The light source 101 illuminates the surface S through the aperture H of the housing 100, and the light reflected from the surface S and passing through the aperture H is then received by the image capturing unit 104. The light source control unit 102 is for adjusting the emitting cycle of the light source 101. At least one threshold value is stored in the storage unit 103. The image capturing unit 104 captures images with a fixed sampling period and the emitting cycle of the light source 101 is set as an integral multiple of the sampling period. In this manner, image capturing of the image capturing unit 104 can be synchronized to the illumination of the light source 101, such that the image capturing unit 104 can effectively capture optical images reflected from the surface S. The processing unit 105 compares the effective images captured by the image capturing unit 104 so as to obtain displacements between two consecutive effective images. The processing unit 105 also compares the obtained displacement with the threshold value stored in the storage unit 103 and controls the light source control unit 102 to dynamically adjust the emitting cycle of the light source 101 according to a comparison result of comparing the displacement and the threshold value. It should be noticed that, the term "effective image" herein refers to the image captured by the image capturing unit 104 during a time interval that the light source 101 illuminates. In this manner, when a displacement of the motion estimation device 10 with respect to the surface S between two consecutive effective images increases, the light source control unit 102 shortens the emitting cycle of the light source 101; on the contrary, when the displacement decreases, the light source control unit 102 prolongs the emitting cycle of the light source 101 so as to save the consuming power of the motion estimation device 10. Finally, the displacement of the motion estimation device 10 will be transmitted to the image display device 90 through the transmission interface unit 106 so as to accordingly control the image display device 90.

In addition, a lens (or a lens set) 107 can be selectively disposed in front of the light source 101 to adjust the illumination area of the light source. Furthermore, a lens (or a lens set) 107 can be selectively disposed in front of the image capturing unit 104 to improve the sensing efficiency of the image capturing unit 104. In the present invention, the displacement obtained by the processing unit 105 needs not to be further calculated as a velocity such that the loading of the processing unit 105 and total consuming power can be reduced.

Figure 3:
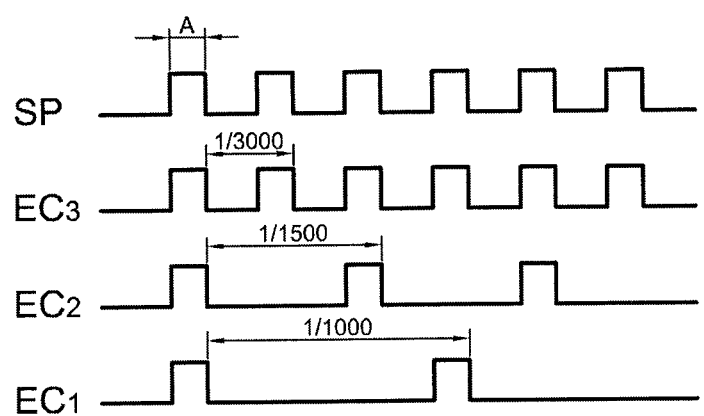
FIG. 3 shows a timing diagram of the sampling period of an image capturing unit as well as the emitting cycle of a light source in the motion estimation device according to one embodiment of the present invention.

Referring to FIG. 3, it schematically shows a timing diagram of the sampling period SP of the image capturing unit 104 and three possible emitting cycles $EC_1$, $EC_2$ and $EC_3$ of the light source 101 according to one embodiment of the present invention, wherein it is assumed that SP=1/3,000 second, $EC_1$=1/1,000 second, $EC_2$=1/1,500 second and $EC_3$=1/3,000 second. In this embodiment, the emitting cycles $EC_1$, $EC_2$ and $EC_3$ are integral multiples of and synchronize to the sampling period SP, i.e. during time intervals "A" that the image capturing unit 104 captures images, the light source 101 simultaneously provides the needed light for image capturing. However, the length of time intervals "A" is not limited to be identical to the illuminating time of the light source 101. In this manner, although the image capturing unit 104 captures images with a fixed sampling period SP, the effective images captured by the image capturing unit 104 are actually controlled by the emitting cycle of the light source 101 because the light source 101 is controlled by the light source control unit 102 and may not provide the needed light for image capturing during every time intervals "A". The processing unit 105 performs the calculation of displacement according to the effective images captured by the image capturing unit 104. It should be appreciated that, the sampling period SP as well as the emitting cycles $EC_1$, $EC_2$ and $EC_3$ shown in FIG. 3 and the number of emitting cycles are only one exemplary embodiment and they are not used to limit the present invention.

Figure 4:
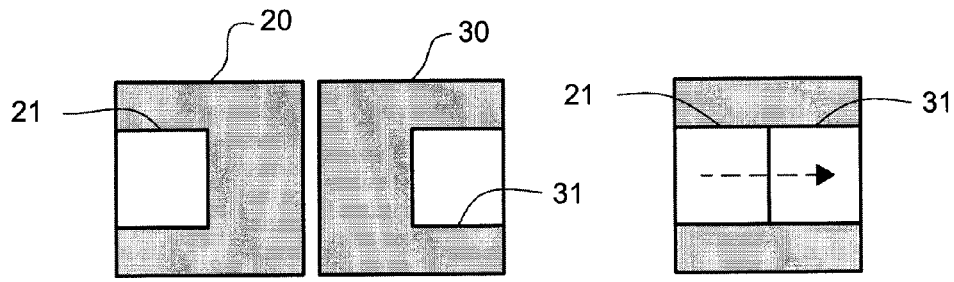
FIG. 4 shows a schematic diagram of the maximum detectable displacement of a processing unit of the motion estimation device according to one embodiment of the present invention.

Referring to FIGS. 3 and 4, the maximum displacement between two consecutive effective images which can be detected by the processing unit 105 will be illustrated hereinafter to be served as a reference for setting the threshold value. In one embodiment, the image capturing unit 104 captures two effective images, e.g. a first image 20 and a second image 30, at two time points separated by one emitting cycle of the light source 101, and a reference searching block 21 is defined in the first image 20; a searching block 31 is defined in the second image 30. The processing unit 105 calculates a displacement between the reference searching block 21 and the searching block 31 to be served as the displacement of the motion estimation device 10 with respect to the surface S. For illustration purpose, only X-axis (transverse direction in the figure) is considered in FIG. 4. X-axis and Y-axis components are both included in the displacement during actual operation. The maximum detectable displacement is obtained according to the condition that the reference searching block 21 locates at the left side of the first image 20 and the searching block 31 locates at the right side of the second image 30. In this embodiment, it is assumed that each frame (equal to the size of the sensing array of the image capturing unit) has 16×16 pixels, and the searching block 31 and the reference searching block 21 have 8×8 pixels. A maximum detectable displacement of the processing unit 105 between two successive effective images is 8 pixels and thus 8 pixel length is set as the threshold value herein. Because the maximum detectable displacement is determined by the size of each frame and without being influenced by the emitting cycle of the light source 101, i.e. the maximum detectable displacement is the same under various emitting cycles of the light source 101, the threshold value can be adapted to various high-end and low-end products.

It is appreciated from the above description that, when the displacement of the motion estimation device 10 between two successive effective images is larger than 8 pixels, the emitting cycle of the light source 101 should be shortened such that the processing unit 105 is able to detect the displacement. In other words, when the displacement of the motion estimation device 10 is larger than the maximum detectable displacement, the processing unit 105 is unable to calculate the displacement. Thus, the emitting cycle of the light source 101 should be shortened such that the motion estimation device 10 can function normally. It can be understood that, the values given herein are only exemplary embodiments of the present invention and are not used to limit the present invention. Those values can be determined based on product design.

Figure 5:
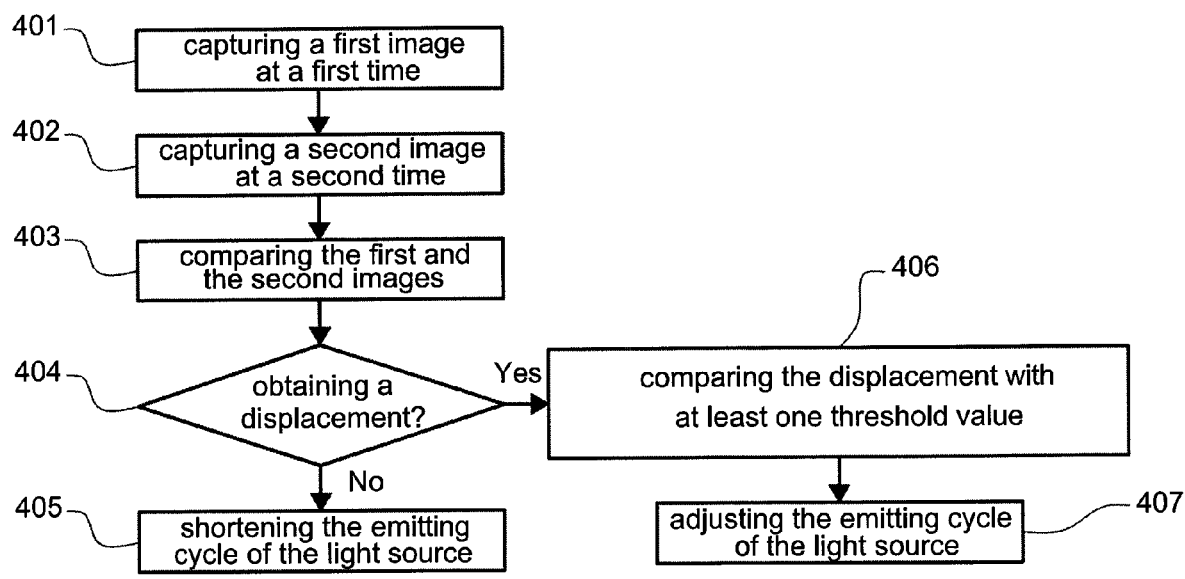
FIG. 5 shows a flow chart of the power saving method for a motion estimation device according to one embodiment of the present invention.

Referring to FIG. 5, it shows a flow chart of the power saving method for a motion estimation device 10 according to one embodiment of the present invention. The power saving method includes the steps of: capturing a first image at a first time (step 401); capturing a second image at a second time (step 402); comparing the first image and the second image (step 403); determining whether a displacement can be obtained (step 404); if not, shortening the emitting cycle of the light source (step 405); if yes, comparing the displacement with at least one threshold value (step 406); and adjusting the emitting cycle of the light source (step 407). According to the present invention, when the displacement is lower than a predetermined threshold value, the light source 101 illuminates with a longer emitting cycle so as to saving the power consumption of the motion estimation device 10.

Referring to FIGS. 2 to 6b, the power saving method for a motion estimation device 10 of one embodiment of the present invention will be illustrated hereinafter. Herein, it is assumed that the light source 101 illuminates with an emitting cycle of $EC_1$ (1/1,000 second). Firstly, the image capturing unit 104 captures an effective image at a first time, e.g. a first image 20, which can be an image captured before the motion estimation device 10 starts to move or when the motion estimation device 10 is moving. The image capturing unit 104 captures another effective image, e.g. a second image 30, after one emitting cycle (1/1,000 second) of the light source 101 when the first image 20 was captured (step 401). It can be seen from FIG. 3 that, actually the image capturing unit 104 captured another two images within this emitting cycle. Since the light source 101 does not illuminate in the time interval between the first image 20 and the second image 30 being captured, images captured by the image capturing unit 104 between the first time and the second time are not effective images. Furthermore, in the present invention, the processing unit 105 is set to process the effective images only. Then, the processing unit 105 compares the reference searching block 21 of the first image 20 and the searching block 31 of the second image (step 403) and determines whether a displacement can be obtained or not (step 404). When a displacement is unable to be obtained, that means the emitting cycle $EC_1$ of the light source 101 is too long, the processing unit 105 controls the light source control unit 102 to shorten the emitting cycle of the light source 101 to $EC_2$, e.g. 1/1,500 second (step 405). When it is able to obtain a displacement, the processing unit 105 compares the obtained displacement with the threshold value stored in the storage unit 103 (step 406), and accordingly adjusts the emitting cycle of the light source 101.

Figure 6A:
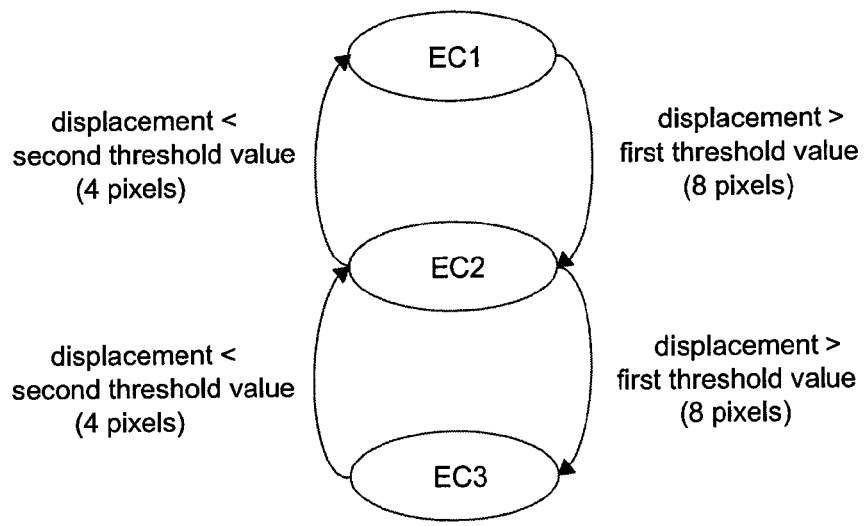
FIG. 6a shows a schematic diagram of adaptively adjusting the emitting cycle of the light source according to a displacement in the power saving method for a motion estimation device according to one embodiment of the present invention.

Referring to FIG. 6a, in one embodiment, a first threshold is set as 8 pixel length and a second threshold is set as 4 pixel length. When the processing unit 105 determines that the displacement of the motion estimation device 10 is larger than 8 pixels, the processing unit 105 controls the light source control unit 102 to adjust the emitting cycle of the light source 101 to $EC_2$ (step 407). Then, the image capturing unit 104 captures another new effective image after another emitting cycle, which may be adjusted as 1/1,500 second or may not be adjusted, and the original second image 30 is updated as a new first image 20 and the new captured effective image is updated as a new second image 30. Then, the process will restart from step 403 and when the displacement of the motion estimation device 10 is determined to be larger than 8 pixels again, the processing unit 105 controls the light source control unit 102 again to adjust the emitting cycle of the light source 101 to $EC_3$; when the displacement of the motion estimation device 10 is determined to be lower than 4 pixels, the processing unit 105 controls the light source control unit 102 to adjust the emitting cycle of the light source 101 to $EC_1$; or the emitting cycle of the light source 101 will be maintained as $EC_2$. In this manner, when the processing unit 105 obtains a lower displacement, the consuming power of the motion estimation device 10 can be saved by prolonging the emitting cycle of the light source 101. It should be appreciated that, the method to obtain a moving distance between two successive effective images is not limited to the method illustrated in the embodiment of the present invention.

Figure 6B:
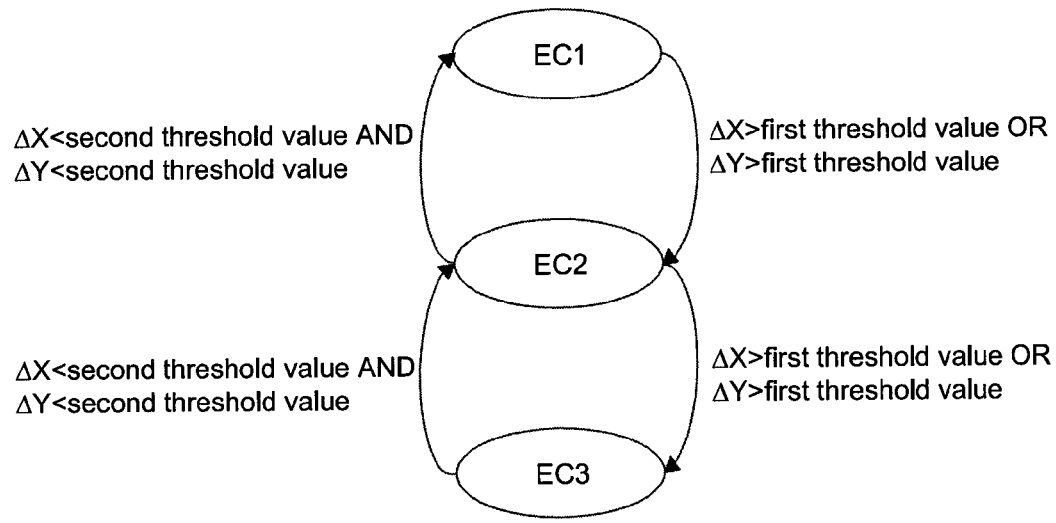
FIG. 6b shows a schematic diagram of adaptively adjusting the emitting cycle of the light source according to a displacement in a first direction and a displacement in a second direction orthogonal to the first direction in the power saving method for a motion estimation device according to one embodiment of the present invention.

Referring to FIG. 6b, it shows another example of the method that the processing unit 105 compares the displacement of the motion estimation device 10 and the threshold value according to another embodiment of the present invention. In this embodiment, a displacement consists of a displacement in a first direction $\Delta X$ and a displacement in a second direction which may be orthogonal to the first direction $\Delta Y$. When the emitting cycle of the light source 101 is $EC_1$ (such as 1/1,000 second) and the processing unit 105 determines that any one of the displacement $\Delta X$ and the displacement $\Delta Y$ is larger than a first threshold (such as 8 pixel length), the processing unit 105 controls the light source control unit 102 to shorten the emitting cycle of the light source 101 to $EC_2$ (such as 1/1,500 second), or the emitting cycle will be maintained as $EC_1$. When the emitting cycle of the light source 101 is $EC_2$ and the processing unit 105 determines that any one of the displacement $\Delta X$ and the displacement $\Delta Y$ is larger than a first threshold, the processing unit 105 controls the light source control unit 102 to shorten the emitting cycle of the light source 101 to $EC_3$ (such as 1/3,000 second); when both of the displacement $\Delta X$ and the displacement $\Delta Y$ are determined to be smaller than a second threshold (such as 4 pixel length), the processing unit 105 controls the light source control unit 102 to prolong the emitting cycle of the light source 101 to $EC_1$, or the emitting cycle will be maintained as $EC_2$. When the emitting cycle of the light source 101 is $EC_3$ and the processing unit 105 determines that both of the displacement $\Delta X$ and the displacement $\Delta Y$ are smaller than a second threshold, the processing unit 105 controls the light source control unit 102 to prolong the emitting cycle of the light source 101 to $EC_2$, or the emitting cycle will be maintained as $EC_3$. That is, in this embodiment, the processing unit 105 compares the threshold value with two components of the displacement of the motion estimation device 10 respectively.

As already mentioned above, in conventional art, the method to save power consumption by changing the sampling period and exposure time of an image sensor has the problem of low stability and low saving efficiency. In addition, the method of changing the illuminating rate of a light source according to the velocity of a motion estimation device also has the problem of having higher calculating loading and the setting of velocity information being not able to be adapted to all products. Compared with conventional art, the motion estimation device and its power saving method of the present invention (as shown in FIGS. 2 and 5) adjusts the emitting cycle of a light source according to the displacement of the motion estimation device so as to effectively save the consuming power of the motion estimation device. Furthermore, since the exposure time of the image capturing unit is fixed in the present invention, the problem of low stability can be solved.

Although the invention has been explained in relation to its preferred embodiment, it is not used to limit the invention. It is to be understood that many other possible modifications and variations can be made by those skilled in the art without departing from the spirit and scope of the invention as hereinafter claimed.

What is claimed is:

1. A power saving method for a motion estimation device, the motion estimation device having a fixed sampling period and comprising a light source illuminating with an adjustable emitting cycle to provide the needed light for the motion estimation device during capturing images, the power saving method comprising the steps of:

capturing a first image at a first time;

capturing a second image at a second time, wherein a time interval between the first time and the second time is equal to one emitting cycle and the emitting cycle is a first integral multiple of the fixed sampling period;

comparing the first image and the second image to obtain a displacement between the first image and the second image;

comparing the displacement with at least one threshold value; and adjusting the emitting cycle of the light source to a second integral multiple of the fixed sampling period according to a comparison result of comparing the displacement and the threshold value and maintaining the fixed sampling period unchanged when adjusting the emitting cycle of the light source, wherein the emitting cycle is longer than the fixed sampling period.

2. The power saving method as claimed in claim 1, further comprising:

shortening the emitting cycle when the displacement is unable to be obtained.

3. The power saving method as claimed in claim 1, wherein the threshold value is determined according to the size of a sensing array of the motion estimation device.

4. The power saving method as claimed in claim 1, wherein the threshold value comprises a first threshold and a second threshold value smaller than the first threshold value, and the step of adjusting the emitting cycle of the light source further comprises:
    shortening the emitting cycle when the displacement is larger than the first threshold; and
    prolonging the emitting cycle when the displacement is smaller than the second threshold.

5. The power saving method as claimed in claim 1, wherein the threshold value comprises a first threshold and a second threshold smaller than the first threshold, and the displacement comprises a displacement in a first direction and a displacement in a second direction, and the step of adjusting the emitting cycle of the light source further comprises:
    shortening the emitting cycle when one of the two displacements is larger than the first threshold; and
    prolonging the emitting cycle when both of the displacements are smaller than the second threshold.

6. A motion estimation device, comprising:
    a light source illuminating with an adjustable emitting cycle;
    a light source control unit for adjusting the adjustable emitting cycle of the light source;
    an image capturing unit having a fixed sampling period, wherein the adjustable emitting cycle of the light source is longer than the fixed sampling period and is an integral multiple of the fixed sampling period;
    a storage unit storing at least one threshold value; and
    a processing unit for obtaining a displacement between two images captured by the image capturing unit at two time points separated by one emitting cycle, comparing the displacement with the threshold value, and controlling the light source control unit to adjust the adjustable emitting cycle of the light source according to a comparison result of comparing the displacement and the threshold value and maintaining the fixed sampling period unchanged when adjusting the adjustable emitting cycle of the light source.

7. The motion estimation device as claimed in claim 6, further comprising a transmission interface unit for transmitting the displacement to an image display device.

8. The motion estimation device as claimed in claim 7, wherein the image display device is selected from a group consisting of a television, a projection screen, a computer screen and a gain machine screen.

9. The motion estimation device as claimed in claim 6, wherein the light source is a light emitting diode or a laser diode.

10. The motion estimation device as claimed in claim 6, further comprising a lens disposed in front of the light source to adjust the illumination area of the light source.

11. The motion estimation device as claimed in claim 6, further comprising a lens disposed in front of the image capturing unit to increase the sensing efficiency of the image capturing unit.

12. The motion estimation device as claimed in claim 6, wherein the image capturing unit is a CCD image sensor or a CMOS image sensor.

13. The motion estimation device as claimed in claim 6, wherein the motion estimation device is an optical mouse or an optical navigation device.

14. The motion estimation device as claimed in claim 6, wherein the processing unit is selected from a group consisting of a digital signal processor, a central processor and a controller.

15. A power saving method for a motion estimation device, the motion estimation device having a predetermined sampling period and comprising a light source illuminating with an adjustable emitting cycle, the power saving method comprising the steps of:
    capturing, using the motion estimation device, a plurality of images with the predetermined sampling period and the adjustable emitting cycle, wherein the adjustable emitting cycle is an integer multiple of the predetermined sampling period;
    comparing two of the plurality of images to obtain a displacement between the two of the plurality of images;
    comparing the displacement with at least one threshold value;
    adjusting the adjustable emitting cycle of the light source according to a comparison result of comparing the displacement and the threshold value; and
    maintaining the predetermined sampling period unchanged when adjusting the adjustable emitting cycle of the light source.

16. The power saving method as claimed in claim 15, further comprising:
    shortening the adjustable emitting cycle when the displacement is unable to be obtained.

17. The power saving method as claimed in claim 15, wherein the threshold value is determined according to the size of a sensing array of the motion estimation device.

18. The power saving method as claimed in claim 15, wherein the threshold value comprises a first threshold value and a second threshold value smaller than the first threshold value, and the step of adjusting the adjustable emitting cycle of the light source further comprises:
    shortening the adjustable emitting cycle when the displacement is larger than the first threshold; and
    prolonging the adjustable emitting cycle when the displacement is smaller than the second threshold.

19. The power saving method as claimed in claim 15, wherein the threshold value comprises a first threshold and a second threshold smaller than the first threshold, and the displacement comprises a displacement in a first direction and a displacement in a second direction, and the step of adjusting the emitting cycle of the light source further comprises:
    shortening the adjustable emitting cycle when one of the two displacements is larger than the first threshold; and
    prolonging the adjustable emitting cycle when both of the displacements are smaller than the second threshold.

* * * * *